United States Patent [19]

Shibata et al.

[11] Patent Number: 5,108,795
[45] Date of Patent: Apr. 28, 1992

[54] COATING METHOD USING AN EXTRUSION TYPE COATING APPARATUS

[75] Inventors: Norio Shibata; Tsunehiko Sato, both of Kanagawa, Japan

[73] Assignee: Fuji Photo Film Co., Ltd., Kanagawa, Japan

[21] Appl. No.: 647,675

[22] Filed: Jan. 25, 1991

Related U.S. Application Data

[63] Continuation of Ser. No. 305,595, Feb. 3, 1989, abandoned.

[30] Foreign Application Priority Data

Mar. 11, 1988 [JP] Japan .................. 63-56439

[51] Int. Cl.$^5$ ........................... B05D 3/12
[52] U.S. Cl. ........................ 427/356; 118/410
[58] Field of Search .............. 118/410, 411; 427/356

[56] References Cited

U.S. PATENT DOCUMENTS

| | | | |
|---|---|---|---|
| 4,023,526 | 5/1977 | Ashmus et al. | 118/410 |
| 4,424,762 | 1/1984 | Tanaka et al. | 118/410 |
| 4,480,583 | 11/1984 | Tanaka et al. | 118/410 |
| 4,581,254 | 4/1986 | Cunningham et al. | 427/356 X |
| 4,854,262 | 8/1989 | Chino et al. | 427/356 X |

FOREIGN PATENT DOCUMENTS 57-84771  5/1982  Japan .
58-104666  6/1983  Japan .
59-94657  5/1984  Japan .

Primary Examiner—Shrive Beck
Assistant Examiner—Alain Bashore
Attorney, Agent, or Firm—Sughrue, Mion, Zinn, Macpeak & Seas

[57] ABSTRACT

A coating method utilizing an extrusion type coating apparatus having a back edge surface and a doctor edge surface for continuous extrusion of a coating fluid from a slot formed between the back edge surface and the doctor edge surface for applying the coating fluid onto a surface of a flexible support running continuously over both the back edge surface and the doctor edge surface. The doctor edge surface is located on a downstream side of the running of the support is so as to form a single inclined planar surface or a curved surface with a single curvature, so that when a point A represents a downstream end of the doctor edge and a point B represents a slot-top portion of the back edge surface, a line AB connecting the points A and B is achieved so that the doctor edge surface does not intersect. $\theta_1$ represents an angle between a tangent to the back edge surface at the point B and the line AB, and $\theta_2$ represents an angle between the line AB and the support stretched downstream from the point A. The angles $\theta_1$ and $\theta_2$ satisfy the conditions: $150° < \theta_1 < 180°$ and $150° < \theta_2 < 180°$, whereby the range of thickness of coating film to be supplied is adjusted by changing the angle $\theta_2$.

4 Claims, 4 Drawing Sheets

COATING METHOD USING AN EXTRUSION TYPE COATING APPARATUS

This is a continuation of application Ser. No. 07/305,595, filed Feb. 3, 1989 now abandoned.

BACKGROUND OF THE INVENTION

1. Field of the Invention

The present invention relates to a coating method and apparatus and, particularly relates to a coating method and apparatus for applying a coating fluid onto a continuously running flexible support.

2. Description of the Prior Art

Heretofore, the application of a coating fluid having suitable fluidity onto a running flexible support for manufacturing industrial goods, for example, produced by use of magnetic coating fluid, photographic light-sensitive coating fluid, pressure-sensitive coating fluid, thermo-sensitive coating fluid or the like, has been employed due to superior productivity of conventional methods and apparatus.

For example, in the case of manufacture of magnetic recording media such as magnetic tape, there are various kinds of methods, such as those described in Japanese Patent Unexamined Publication Nos. 57-84771 and 58-104666, which uses a coating apparatus with a doctor edge surface 5a composed of two planes as shown in FIG. 6, and those described in Japanese Patent Unexamined Publication No. 59-94657, which uses a coating apparatus with a doctor edge surface 5a having a curved surface so that a tangent can be drawn from the downstream end of a back edge 6 to the doctor edge surface 5a as shown in FIG. 7.

However, in the case where the coating apparatuses having the aforementioned edge forms are employed, the allowable range of thickness of coating film which can be obtained changes in accordance with changes in factors such as the application speed, the physical properties of coating fluid (in particular, viscosity), the thickness of the support, and the like. A problem exists in that the coating apparatuses having such edge forms cannot be used for producing multiple various kinds of articles, since the required film thickness for such articles often is not within allowable thickness range achievable using these edge forms. Alternatively, the productivity of such coating apparatuses is very low even though the required film thickness may be obtained for a small percentage of the samples. Although coating apparatuses capable of producing a necessary film thickness can be provided by changing the edge form, such a procedure is disadvantageous in that the cost increases due to the time needed for frequent preparation of the extruders corresponding to the necessary film thickness, and a great deal of labor is required for searching the allowable film thickness range peculiar to each coating apparatus. The problem is not limited, to the case where different kinds of articles are manufactured. The same problem exists in the case where the coating thickness is changed in the same article and in the same allowable film thickness range.

SUMMARY OF THE INVENTION

An object of the present invention is, in view of the problems solved in the prior art, to provide a coating method and apparatus in which the allowable range of thickness of the coating film to be applied can be easily adjusted in order to widen the practical application without lowering productivity.

The foregoing object of the present invention can be attained with a coating method utilizing an extrusion type coating apparatus having a back edge surface and a doctor edge surface for continuous extrusion of a coating fluid from a slot formed between the back edge surface and the doctor edge surface for applying the coating fluid onto a surface of a flexible support running continuously over both the back edge surface and the doctor edge surface. The doctor edge surface is located on a downstream side of the running of the support so as to form a single inclined planar surface or a curved surface with a single curvature, so that when a point A represents a downstream end of the doctor edge and a point B represents a slot-top portion of the back edge surface, a line AB connecting the points A and B is achieved so that the doctor edge surface does not intersect, $\theta_1$ represents an angle between a tangent to the back edge surface at the point B and the line AB, and $\theta_2$ represents an angle between the line AB and the support stretched downstream from the point A. The angles $\theta_1$ and $\theta_2$ satisfy the conditions: $150° < \theta_1 < 180°$ and $150° < \theta_2 < 180°$, whereby the range of thickness of coating film to be supplied is adjusted by changing the angle $\theta_2$.

DETAILED DESCRIPTION OF THE PREFERRED EMBODIMENTS

The present invention will be described in detail with reference to the drawings.

Figure 1:
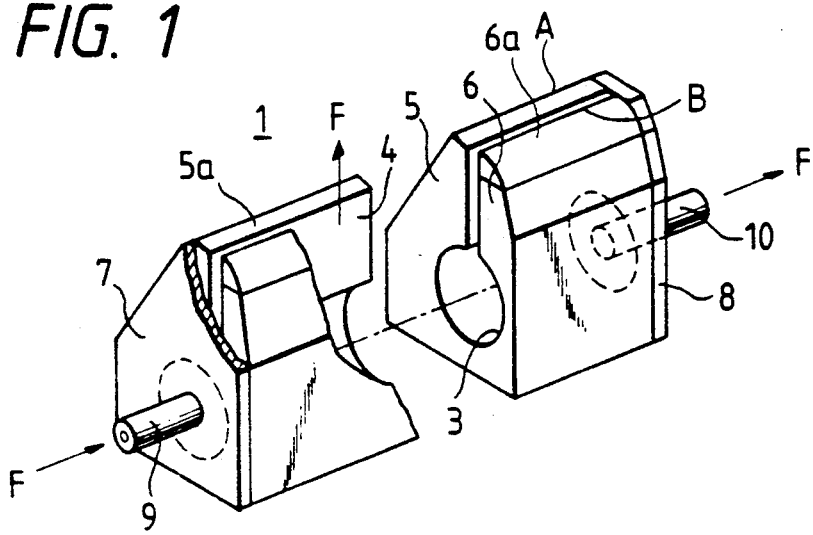
FIG. 1 is a perspective view of an extruder for carrying out the method of the present invention.
Figure 2:
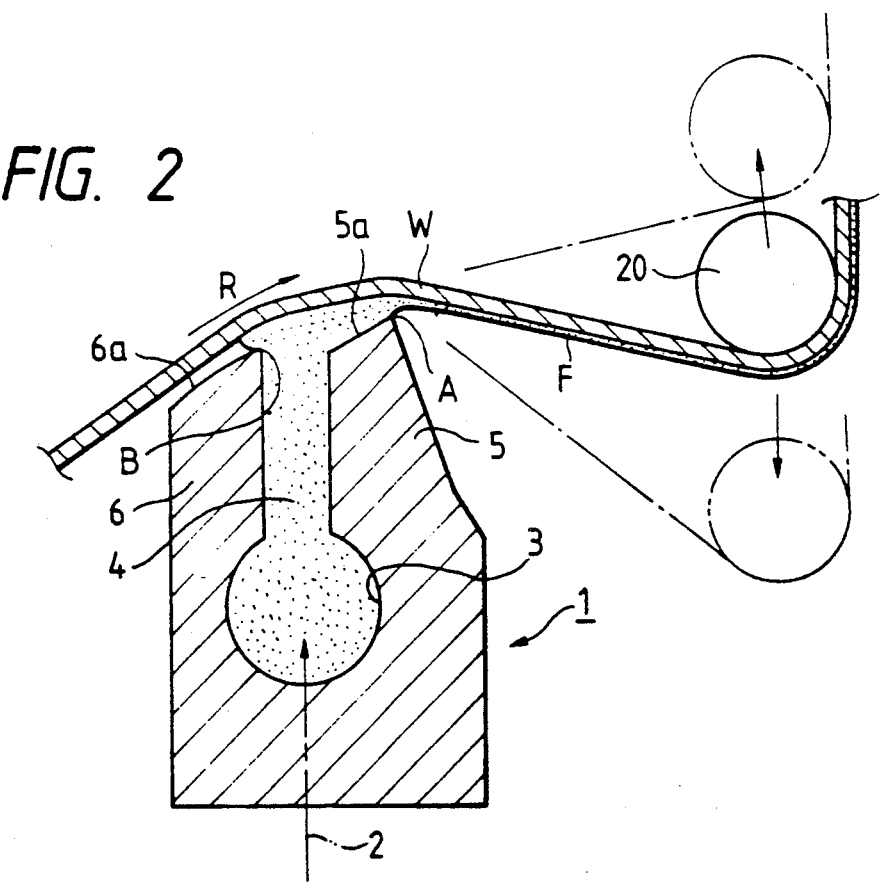
FIG. 2 is a transverse sectional view of the extruder depicted in FIG. 1.
Figure 3:
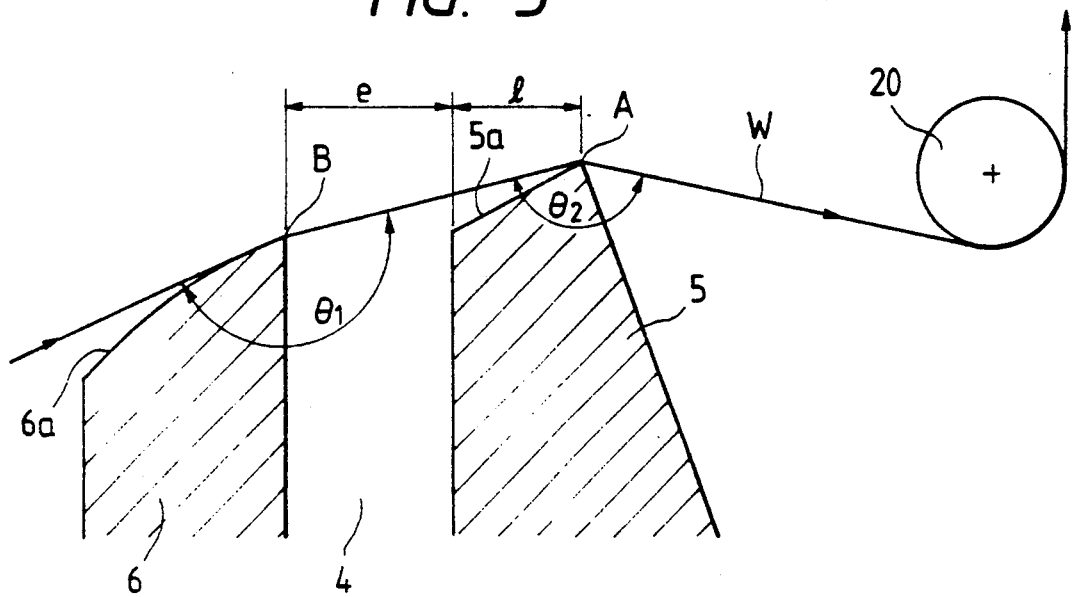
FIG. 3 is a partly enlarged view through FIG. 2.

FIGS. 1, 2 and 3 show an extruder 1 in a coating apparatus for production of a magnetic recording medium, in which the method of the present invention is applied.

As shown in FIGS. 1 and 2, the extruder 1 is constructed so that a coating fluid F of magnetic dispersion is fed to a pocket portion 3 from an external fluid supply system 2. The fluid F is extruded from the pocket portion 3 toward a continuously running support W through a slot portion 4 located between a doctor edge portion 5 and a back edge portion 6. The external fluid supply system 2 connected to the extruder includes a fluid feeding pump capable of feeding the coating fluid F continuously and quantitatively, and a piping member for making the fluid feeding pump and the pocket portion communicate with each other.

The pocket portion 3 has a circular cross-section and extends in the direction of width of the support W, so that the pocket portion 3 serves as a fluid reservoir. In general, the effective extension length of the pocket portion 3 is equal to or slightly larger than the width of the coating layer.

Openings at both ends of the pocket portion 3 are closed by shield plates 7 and 8. Short pipes 9 and 10 are connected to the shield plates 7 and S, respectively, so that a portion of the coating fluid F injected into the pocket portion 3 through the short pipe 9 is drawn off through the short pipe 10. Accordingly, the pocket portion 3 is designed to prevent the retention of coating fluid F in the pocket portion and, in particular, so as to be very effective for applying magnetic coating fluid which is easily denatured due to its thixotropy and aggregation.

The slot portion 4 has a relatively narrow flow path which extends through the body of the extruder 1 from the pocket portion 3 to the support W. In general, the aperture width $\theta$ of the slot portion 4 is 0.03 to 2 mm. The slot portion 4 extends in the widthwise direction of the support W in the same manner as the pocket portion 3, so that the length of the aperture in the widthwise direction of the support W is approximately equal to the coating width. The length of the flow path of the slot portion 4 toward the support W is established in consideration of factors, such as the composition of the coating fluid F, the physical properties thereof, the volume of the supply flow, the supply fluid pressure and the like. In short, the length of the flow path is determined so that the coating fluid F can be drawn out of the pocket portion 3 in the form of a laminar flow having uniform flow volume and uniform fluid pressure distribution in the widthwise direction of the support W.

The doctor edge 5 is located downstream from the outlet of the slot portion 4 with respect to the running direction of the support W. The doctor edge 5 has a surface 5a formed as a single inclined plane and inclined at an angle of from about 2°-30°, so that a point A representing a downstream end of the surface 5a is closest to the support W. The width l of the doctor edge 5 is within a range of from 0.05 mm to 1.5 mm.

On the other hand, the back edge portion 6 is located upstream from the outlet of the slot portion 4 with respect to the running direction of the support W. The back edge portion 6 has a surface 6a formed so that it is curved in the same manner as in the prior art. It is a matter of course that the back edge surface 6a may be formed to be a plane.

With a point B representing the boundary (a slot-top portion) of the back edge surface 6a and the slot portion 4, a line AB connecting the points A and B is established so that it is not intersected by the doctor edge surface 5a, $\theta_1$ represents the angle between a tangent to the back edge surface 6a at the point B and the line AB, or in other words angle $\theta_1$ represents the degree of change of the support W taken in the running direction of the support W by reference to the point B. $\theta_1$ satisfies the relation: $150° < \theta_1 < 180°$. $\theta_2$ represents an angle between said line AB and the support W stretched downstream from the point A and satisfies the relation: $150° < \theta_2 < 180°$.

The angles $\theta_1$ and $\theta_2$ can be determined by the positions of support running guide means (not shown) and a running guide roll 20 arranged, respectively, just before and just behind the extruder 1, as well as the positional relationship between the points A and B.

In this embodiment, the running guide roll 20 is movable so that the angle $\theta_2$ can be changed as shown in the imaginary lines of FIG. 2.

According to the apparatus configured as described above, the support W is brought between respective running guide means, such as guide rollers, under approximately constant tension and so as to be capable of being curved slightly in the widthwise direction. The support W is moved near the doctor edge surface 5a and the back edge surface 6a through an extruder supporting mechanism (not shown) in a manner such that it is curved along the edge surfaces 5a and 6a. When the coating fluid F is applied with a predetermined flow rate from the supply system 2 the coating fluid F passes through the pocket portion 3 and the slot portion 4 and is then extruded to the top portion, of the outlet of the slot portion 4 with a uniform flow rate and pressure distribution in the widthwise direction of the support W.

The coating fluid F extruded to the top portion of the outlet of the slot portion 4 overflows slightly onto the back edge surface 6a to form "beads". While fluid pressure which is controlled by adjusting the position of the guide roll 20 is generated to prevent the entrained air of the support W from intermixing and, at the same time, to form a slight space between the surface of the support W and each edge portion, the coating fluid F is passed along the surface of the support W, which is moving continuously in the direction of the arrow R, causing the space between the doctor edge surface 5a of the doctor edge 5 and the support W to widen.

While the movement of the coating fluid F is continuously maintained, the entire edge surface of the doctor edge portion 5 and the surface of the support W are separated by a predetermined distance from each other by the coating fluid F. The fluid F has a laminar flow across the entire area in the widthwise direction.

In general, the separation distance, or in other words the thickness of coating film, can be changed by varying factors such as the tension of the support W. the supply volume of the coating fluid, and the like. However, the maximum allowable film thickness is determined by whether or not the coating fluid overflows upstream. On the other hand, the minimum allowable film thickness is determined by whether or not the air entrained by the support W intrudes in between the support W and the coating fluid F. Accordingly, the range of film thickness allowable is directly related to the pressure of the coating fluid in between the support W and each edge surface of the extruder 1, and in particular, in the vicinity of the upstream meniscus.

Because the doctor edge surface 5a is inclined so that the backward end (the portion A) thereof gradually approaches the support W in the running direction of the support W, to thereby determine the film thickness, the pressure of the coating fluid F extruded from the slot portion 4 is prevented from dispersing. Accordingly, the pressure of the coating fluid F can be easily increased. In addition, the extrusion pressure of the coating fluid F can effectively serve as the pressure for coating. By vertically moving the guide roll 20 (to change $\theta_1$), the pressure of the coating fluid can very easily be changed while being maintained at a relatively large level. Consequently, it is assumed that the range of allowable film thickness which may be applied can be greatly altered. Further, it is possible to change the film thickness without significantly changing the tension of the support W. This is the main reason that the range of the allowable film thickness can be greatly altered regardless of the strength of the support W.

The adjustment of the guide roll 20 is carried out as follows. To decrease the thickness range of the allowable coating film $\theta_2$ is increased (near 180°). To decrease the thickness range of the allowable coating film, $\theta_2$ is decreased. By increasing the running speed of the support W while reducing the width (1) of the doctor edge 5, the film thickness can be reduced due to the relatively large value of $\theta_2$ compared with the value of $\theta_2$ during low speed running of the support W. The value of $\theta_2$ cannot be reduced without restriction. Good results were obtained experimentally when $\theta_2$ was within a range of from 150° to 180°. On the other hand, good results were obtained when $\theta_1$ was also within the range of 150° to 180°.

Figure 4:
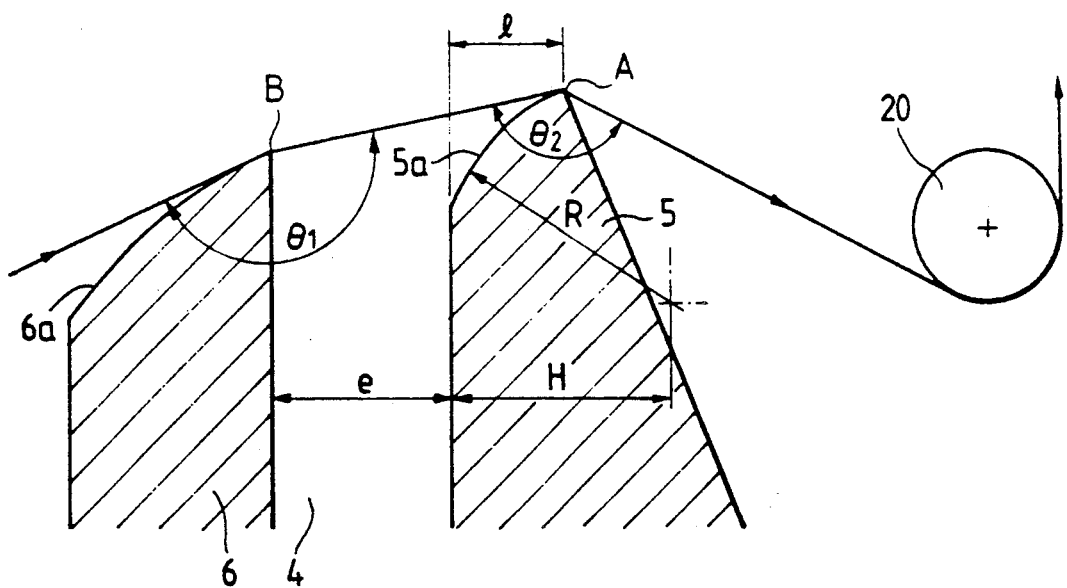
FIG. 4 is a partly transverse sectional view of an extruder in which the sectional form of the doctor edge surface according to the present invention is changed.

Although the aforementioned embodiment illustrates the case where the doctor edge surface 5a forms a flat plane as shown in FIG. 3, it is to be understood that the invention is not limited thereto, and the doctor edge surface 5a may have a curved surface having single curvature R as shown in FIG. 4. In this modified case, the doctor edge surface 5a is inclined so that the downstream end (the point A) is the closest point to the support W, but the curve of the doctor edge surface 5a does not curve so much as to form a plane approximately parallel to the running direction of the support. In other words, the doctor edge surface 5a has an angle of attack that suitable pressure is always produced in the coating fluid F.

It is a matter of course that the invention is not limited to the method of applying magnetic dispersion fluid as shown in the aforementioned embodiment and that the invention is applicable to photographic light-sensitive coating fluid, pressure-sensitive coating fluid, thermo-sensitive fluid an the like.

As described above, according to the coating method of the present invention, an extruder is constructed so that a doctor edge surface 5a disposed at a downstream side of the running direction of a support W is formed to be a single inclined planar surface or a curved surface of a single curvature, and so that the line AB connecting a downstream end (the point A) of the doctor edge surface 5a and a slot-top portion (the point B) of the back edge surface 6a is established so as not to intersect and then not to wrap over the rest of the doctor edge surface 5a toward the point A. An angle ($\theta_1$) between a tangent to the back edge surface 6a at the point B and the line AB, and an angle ($\theta_2$) between the line AB and the support W stretched downstream from the point A are maintained within a range of from 150° to 180°. Accordingly, the dispersion of pressure of the coating fluid F extruded from the extruder is prevented, so that the extrusion pressure of the coating fluid F can be used effectively for application of the coating fluid F. Furthermore, the pressure of the coating fluid F can be changed easily by adjusting $\theta_2$, so that the range of film thickness to be applied can be widened. Consequently, the problems involved in the prior art can be avoided, such as the great amount of labor required to change the form of the edges in the extruder, or searching the range of allowable coating film thickness of a newly produced extruder in order to obtain a necessary thickness of the coating film.

The novel effect of the invention will be apparent from the following example.

EXAMPLE

Constituent members of a composition shown in Table 1 were put into a ball mill and sufficiently mixed (for seven hours) and dispersed to prepare a magnetic coating fluid.

TABLE 1

| | |
|---|---|
| $\tau$-Fe$_2$O$_3$ powder (needle-shape particles with the mean particle diameter of 0.5 mm in the major axis, the coercive force of 320 Oe) | 95 part |
| Polyurethane resin (tradename: "NIPPOLLAN 2304") | 10 part |
| Epoxy resin | 9 part |
| Polyisocyanate | 4 part |
| Carbon black | 2 part |
| Palmitic acid | 2 part |
| Cyclohexane | 200 part |

The equilibrium viscosity of the magnetic coating fluid thus prepared was measured by a SHIMADZU RHEOMETER RM-1 made by Shimadzu Corp., and the equilibrium viscosity was 1.2 Poise at the shear rate of 1000 sec$^{-1}$.

Application of the coating fluid shown in Table 1 was carried out under the following conditions related to the range of allowable coating film thickness.

| 1. Support | |
|---|---|
| Material | polyethylene terephthalate film |
| Thickness | 15 μm |
| Width | 500 mm |
| Tension | 5 kg/m |
| Support running speed | 200 m/min |

2. Extruder

Sample No. 1 is an extruder according to the present invention as shown in FIG. 4, in which: the curvature(R) of the doctor edge surface (5a) is 3.5 mm: the distance (H) of the curvature center from the slot portion is 0.9 mm; and the aperture width (e) of the slot portion is 0.6 mm. The angle($\theta_1$) is kept maintained at approximately a 155°.

Figure 6:
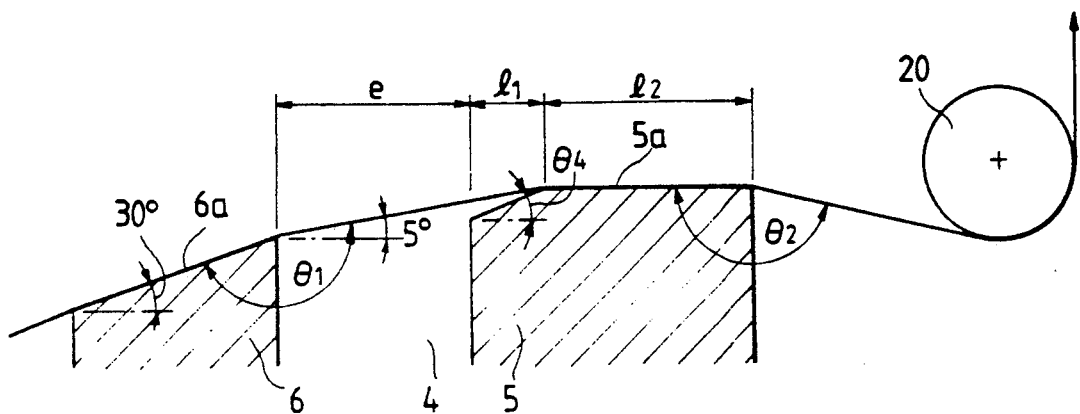
FIGS. 6 and 7 are sectional views showing the top end portion of a conventional extruder.
Figure 7:
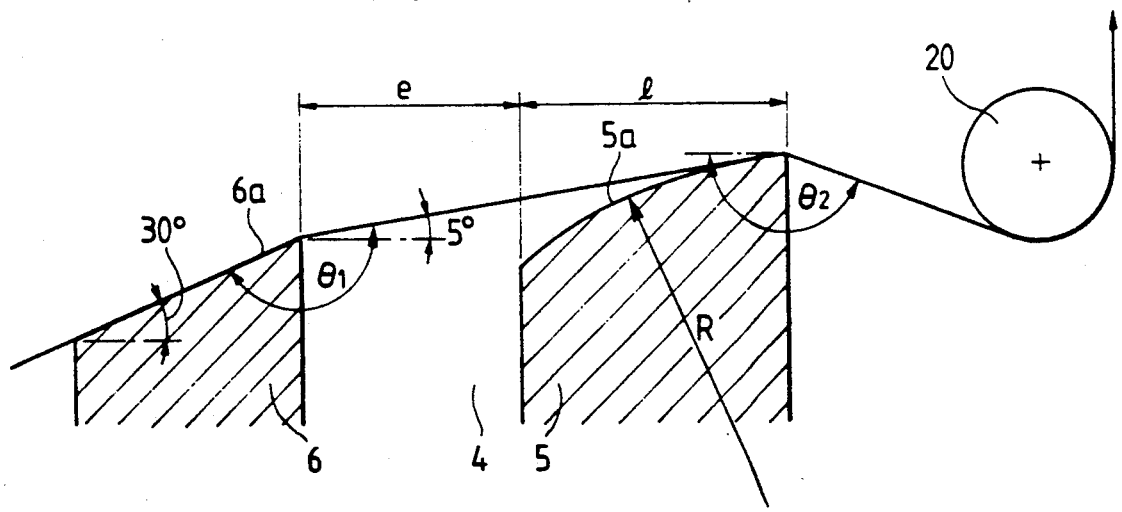

Sample No. 2 is an extruder disclosed in the Japanese Patent Unexamined Publication No. 57-84771. in which: the doctor edge surface (5a) is constituted by two planes as shown in FIG. 6; the upstream-side plane thereof has a width (l$_1$) or 0.5 mm and an inclination angle ($\theta_1$) of 10°; and the downstream-side plane thereof has a width (l$_2$) of 2.5 mm and is approximately parallel to the support. The width (e) of the slot portion is 0.6 mm. In addition, the angle($\theta_1$) is maintained at approximately 155°.

Sample No. 3 is an extruder disclosed in the Japanese Patent Unexamined Publication No. 59-94657, in which: the doctor edge surface (5a) has a width (l) of 3.0 mm and curvature (R) of 5 mm; the downstream-side portion of the doctor edge surface is approximately parallel to the support. The width (e) of the slot portion is 0.6 mm. In addition, the angle $\theta_1$ is maintained at approximately 155°.

Figure 5:
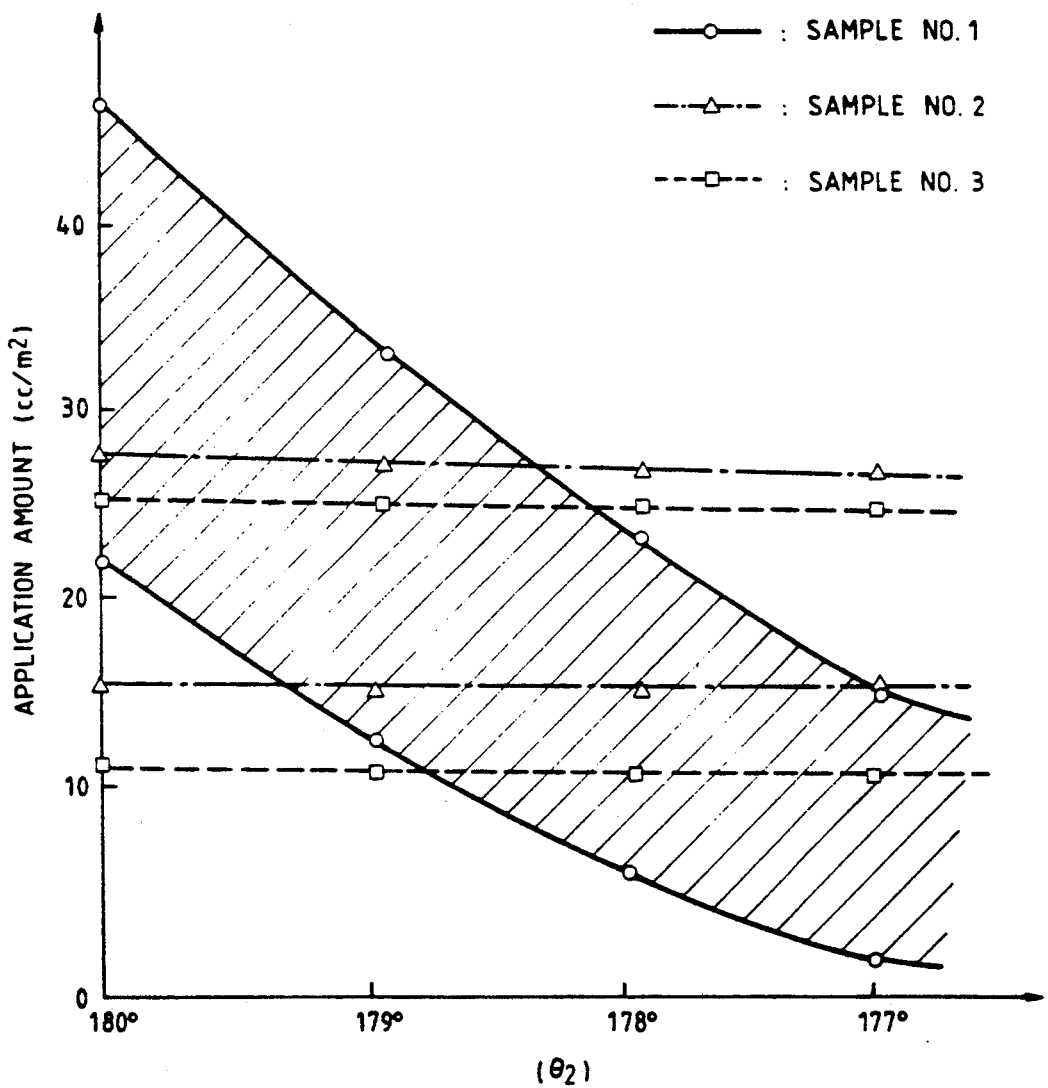
FIG. 5 is a graph view showing the range of application-allowable film thickness in the case where the angle $\theta_2$ is changed.

In each of the aforementioned samples, the upper and lower limits of the range of allowable coating film thickness were obtained by changing the position of the guide roll to change the angle ($\theta_2$) at the point A. The maximum coating film thickness was determined according to the occurrence of thickness irregularities and the like. The minimum coating film thickness was determined according to the occurrence of longitudinal stripes and the like caused by the introduction of the air entrained by the support. The results are shown in the graph of FIG. 5.

Further, sample No. 4 was obtained by changing the value of both angle $\theta_1$ and $\theta_2$, respectively, in order to get the preferable range of degree of both $\theta_1$ and $\theta_2$. The results are shown in Table 2. In Table 2, O represents the cases in which excellent surface coatings of high quality could be obtained. X represents situations in which good quality surface coatings could be obtained despite small problems in the coatings. Finally, X represents serious problems in the coatings.

TABLE 2

| No. | $\theta_1$ | $\theta_2$ | Estimation of Surface Quality of Coatings |
|-----|------|------|---|
| 1   | 170° | 177° | O |
| 2   | 165° | 177° | O |
| 3   | 160° | 177° | O |
| 4   | 155° | 177° | O |
| 5   | 150° | 177° | O |
| 6   | 145° | 177° | X |
| 7   | 155° | 175° | O |
| 8   | 155° | 170° | O |
| 9   | 155° | 165° | O |
| 10  | 155° | 160° | O |
| 11  | 155° | 155° | O |
| 12  | 155° | 150° | X |
| 13  | 155° | 145° | X |

It is apparent from Table 2 that excellent or good coating quality can be obtained when each of $\theta_1$ and $\theta_2$ is within the range of 150° to 180°, as in No. 1-5 and 6-12.

What is claimed is:

1. An extrusion type coating apparatus for applying a coating fluid to a continuously running flexible support comprising:
   a back edge portion having a back edge surface;
   a doctor edge portion having a doctor edge surface, said doctor edge portion being disposed downstream of said back edge portion in the direction of running of said support;
   a slot formed between said back edge surface and said doctor edge surface for applying said coating fluid onto a surface of said flexible support, said flexible support running continuously over both said back edge surface and said doctor edge surface;
   said doctor edge surface being a single inclined planar surface,
   wherein said doctor edge surface does not intersect a plane extending between a downstream end of said doctor edge surface and a slot-top portion of said back edge surface, and
   wherein an angle $\theta_1$ between a tangent to said back edge surface and said plane, and an angle $\theta_2$ between said plane and said support stretched downstream from said downstream end of said doctor edge surface, satisfy the conditions:

$150° < \theta_1 < 180°$ and $150° < \theta_2 < 180°$.

wherein the range of thickness of said coating fluid applied to said support is adjusted by changing said angle $\theta_2$.

2. An extrusion type coating apparatus for applying a coating fluid to a continuously running flexible support comprising:
   a back edge portion having a back edge surface;
   a doctor edge portion having a doctor edge surface, said doctor edge portion being disposed downstream of said back edge portion in the direction of running of said support;
   a slot formed between said back edge surface and said doctor edge surface for applying said coating fluid onto a surface of said flexible support, said flexible support running continuously over both said back edge surface and said doctor edge surface;
   said doctor edge surface being a single inclined curved surface having a single curvature,
   wherein said doctor edge surface does not intersect a plane extending between a downstream end of said doctor edge surface and a slot-top portion of said back edge surface, and
   wherein an angle $\theta_1$ between a tangent to said back edge surface and said plane, and an angle $\theta_2$ between said plane and said support stretched downstream from said downstream end of said doctor edge surface, satisfy the conditions:

$150° < \theta_1 < 180°$ and $150° < \theta_2 < 180°$.

wherein the range of thickness of said coating fluid applied to said support is adjusted by changing said angle $\theta_2$.

3. A method of applying a coating fluid to a continuously running flexible support using an extrusion type coating apparatus comprising the steps of:
   running said flexible support continuously over both a back edge portion and a doctor edge portion disposed downstream of said back edge portion in the direction of running of said support;
   applying said coating fluid onto a surface of said flexible support through a slot formed between said back edge portion and said doctor edge portion;
   forming a doctor edge surface of said doctor edge portion as a planar surface so that said doctor edge surface does not intersect a plane extending between a downstream end of said doctor edge surface and a slot-top portion of a back edge surface of said back edge portion.
   wherein said doctor edge portion and said back edge portion are formed so that an angle $\theta_1$ between a tangent to said back edge surface and said plane, and an angle $\theta_2$ between said plane and said support stretched downstream from said downstream end of said doctor edge surface, satisfy the conditions:

$150° < \theta_1 < 180°$ and $150° < \theta_2 < 180°$, and
   adjusting the range of thickness of said coating fluid applied to said support is by changing an angle $\theta_2$.

4. A method of applying a coating fluid to a continuously running flexible support using an extrusion type coating apparatus comprising the steps of:
   running said flexible support continuously over both a back, edge portion and a doctor edge portion disposed downstream of said back edge portion in the direction of running of said support;
   applying said coating fluid onto a surface of said flexible support through a slot formed between said back edge portion and said doctor edge portion;

forming a doctor edge surface of said doctor edge portion as a curved surface having a single curvature so that said doctor edge surface does not intersect a plane extending between a downstream end of said doctor edge surface and a slot-top portion of a back edge surface of said back edge portion, wherein said doctor edge portion and said back edge portion are formed so that an angle $\theta_1$ between a tangent to said back edge surface and said plane, and an angle $\theta_2$ between said plane and said support stretched downstream from said downstream end of said doctor edge surface, satisfy the conditions:

$$150° < \theta_1 < 180°$$

and $$150° < \theta_2 < 180°.$$

adjusting the range of thickness of said coating fluid applied to said support is by changing an angle $\theta_2$.

* * * * *